United States Patent [19]

Huang et al.

[11] Patent Number: 4,913,811

[45] Date of Patent: Apr. 3, 1990

[54] CLEANER FOR AQUARIUM

[76] Inventors: Liang-Chen Huang; Po-Sheng Huang, both of No. 63, Ta Hsin St., Tainan City, Taiwan

[21] Appl. No.: 322,513

[22] Filed: Mar. 13, 1989

[51] Int. Cl.$^4$ ............................................. A01K 63/04
[52] U.S. Cl. .................................... 210/169; 210/298; 210/413; 119/5
[58] Field of Search ............... 210/169, 298, 407, 413; 119/5; 134/8; 15/1.7

[56] References Cited

U.S. PATENT DOCUMENTS

| | | | |
|---|---|---|---|
| 3,579,381 | 10/1968 | Bailey et al. | 134/8 |
| 3,722,685 | 3/1973 | Orensten et al. | 210/169 |
| 4,402,101 | 9/1983 | van Zyl | 15/1.7 |
| 4,817,561 | 4/1989 | Byrne et al. | 210/169 |

*Primary Examiner*—Richard V. Fisher
*Assistant Examiner*—Coreen Y. Lee
*Attorney, Agent, or Firm*—Bacon & Thomas

[57] ABSTRACT

A cleaner for an aquarium including a filter, a water pump, a waste-pipe with one end connecting to the water pump, an air compressor, a hose with one end connecting to the air compressor, and a base assembly. The base assembly includes a rectangular box having a top sieving plate, a V-shaped gatherer disposed in the box, a cylinder clamped in the box between the sieving plate and the gatherer, a rotatable cleaning brush rotatably disposed in the cylinder, and an actuating paddle wheel fixed to one end of the rotatable cleaning brush. A number of sieving slits are provided on the sieving plate. A hole is provided on the cylinder for receiving the other end of the waste-pipe, and another hole is also provided on the cylinder at its lower surface near one of its ends for receiving the other end of the hose, and a number of notches are formed on the lower surface of the cylinder for passing the depositing impurities. The rotatable cleaning brush pushes the impurities in the cylinder to one end of the cylinder close to the room under the first hole of the cylinder. The actuating paddle wheel is driven by the air bubbling up from the hose so as to drive the rotatable cleaning brush.

8 Claims, 6 Drawing Sheets

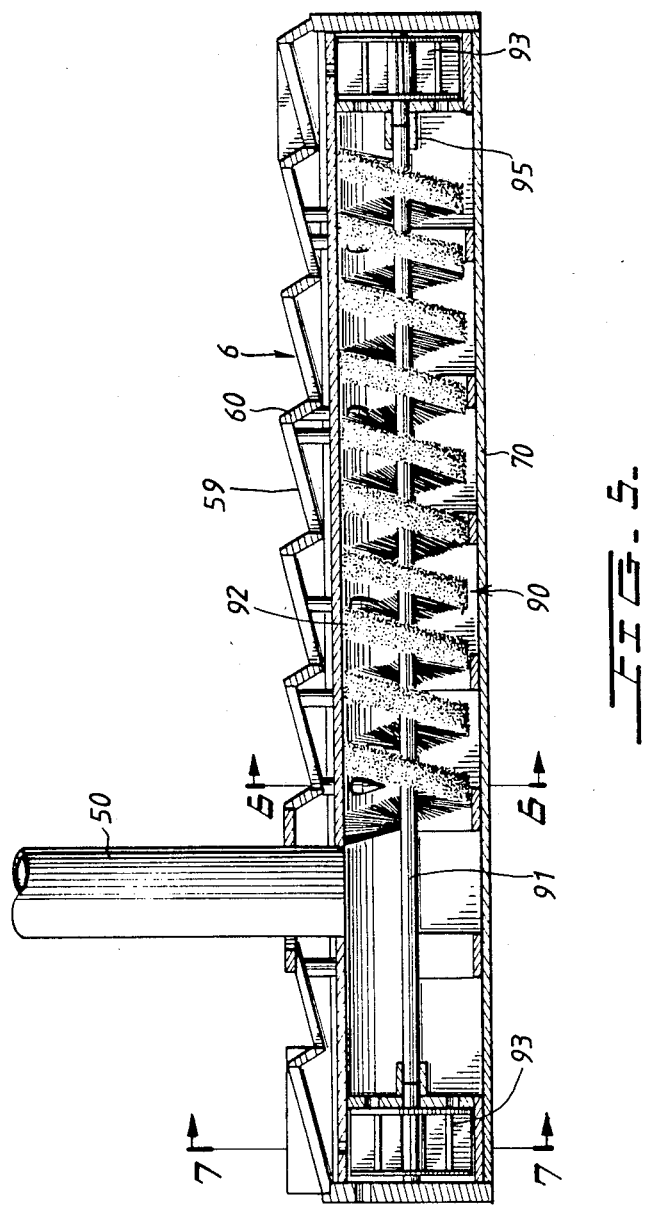

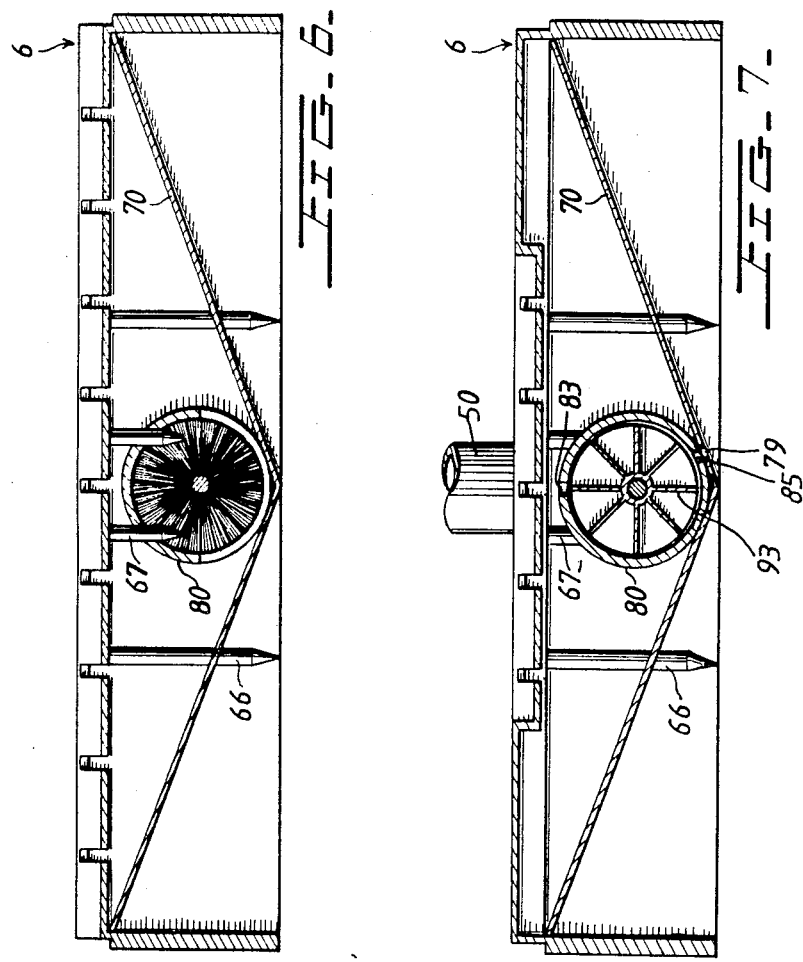

CLEANER FOR AQUARIUM

BACKGROUND OF THE INVENTION

The present invention relates to a cleaner for an aquarium, and more particularly relates to a cleaner having a rotating brush assembly for agitating and collecting the impurities deposited in the aquarium.

Originally, aquariums had no cleaning devices. Therefore, a structure improving the bottom portion (A) of an aquarium has arisen as shown in the prior art (FIG. 1). The bottom portion (A) of the prior art is generally a rectangular box having a top sieving plate (B) with a plurality of sieving slits (C) and four side-plates (D) with a series of vertical grooves (E). The sieving plate (B) is generally a wavy plate having inclined surfaces. The sieving slits (C) are formed on the inclined surfaces of the wavy sieving plate (B). The vertical grooves (E) are provided for decoration and for better circulation of the water flowing around the bottom portion (A). Several dummy blocks (F) are formed on the side-plates, and a hole (G) is formed on the top sieving plate (B) for receiving or connecting a distal end of a waste-pipe. The size of the bottom portion (A) may be varied to fit the size of the aquarium, or, as in the case of large aquariums, several of the bottom portions can be arranged in the aquarium for separating the bottom of the aquarium into several areas. The dummy blocks (F) are cut off for improving the fluid circulation between the bottom portions. The impurities in the aquarium tend to pass through the sieving plate and deposite on the bottom surface of the aquarium. A distal end of the waste-pipe is connected to the hole (G) of the bottom portion to form a passage of the water in the bottom portion. A filter assembly (not shown) is provided for filtering the impurities drawn from inside of the bottom portion (A). However, according to fluid mechanics, the speed of the fluid flowing under the boundary layer is low, especially, the speed of the deposition of impurities on the bottom surface of the aquarium is close to zero. Therefore, they can not be cleaned satisfactorily.

The present invention has arisen to mitigate and/or obviate the afore-described disadvantages of conventional aquarium cleaners.

SUMMARY OF THE INVENTION

The object of the present invention is to provide a cleaner for an aquarium, in which a gatherer is provided to collect the solid impurities in the aquarium in a slot, and a rotating helical brush is further provided to push the solid impurities into one end of the slot for easy cleaning.

The present invention provides a cleaner for an aquarium which comprises a filter, a waterpump, a waste-pipe with one end connected to the waterpump, and a base being provided on the bottom of the aquarium. The base includes a rectangular box having a top sieving plate, a V-shaped gatherer having a slot formed in the middle and being provided under the box, a cylinder being clamped between the sieving plate and the gatherer, and located on top of the slot. The cylinder has a hole formed close to one of its ends for receiving one end of the waste-pipe. A plurality of notches are formed on the lower surface of the cylinder so that the impurities deposited on the gatherer can flow through the notices into the cylinder. A rotatable helical brush is rotatably provided in the cylinder for agitating the impurities towards one end of the cylinder. A paddle wheel is fixed to one end of the rotatable helical brush for driving the same by means of the floating bubbles generated thereunder.

Further objects and advantages of the present invention will become apparent from a careful reading of the detailed description provided hereinbelow, with appropriate reference to the accompanying drawings.

BRIEF DESCRIPTION OF THE DRAWINGS

FIG. 5 is a longitudinal cross-sectional view of the base portion as viewed from line 5—5 of FIG. 3;

FIG. 6 is a lateral cross-sectional view of the base portion as viewed from line 6—6 of FIG. 5; and FIG. 7 is a lateral cross-sectional view of the base portion as viewed from line 7—7 of FIG. 5.

DETAILED DESCRIPTION OF THE PREFERRED EMBODIMENT

Figure 1:
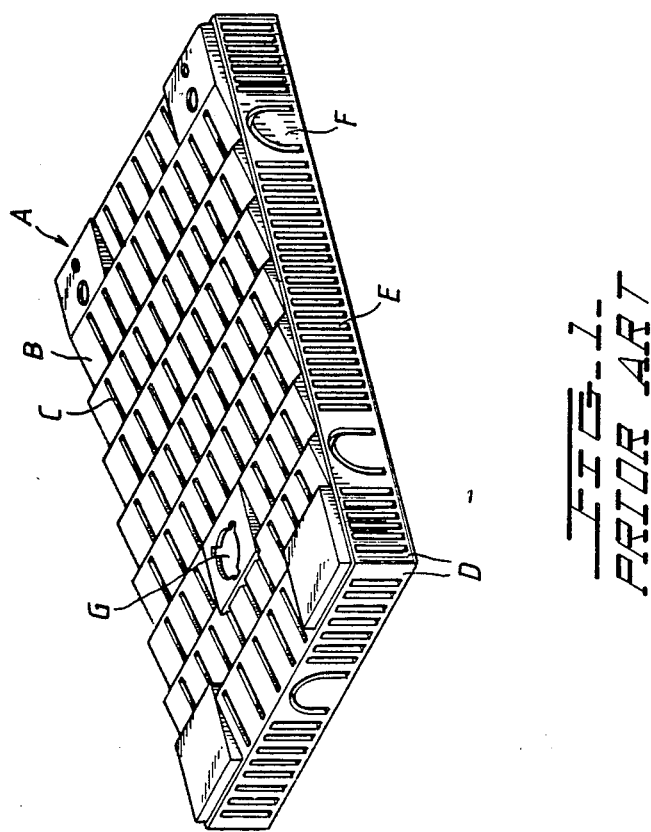
FIG. 1 is a perspective view of the base portion of a conventional aquarium cleaner.
Figure 2:
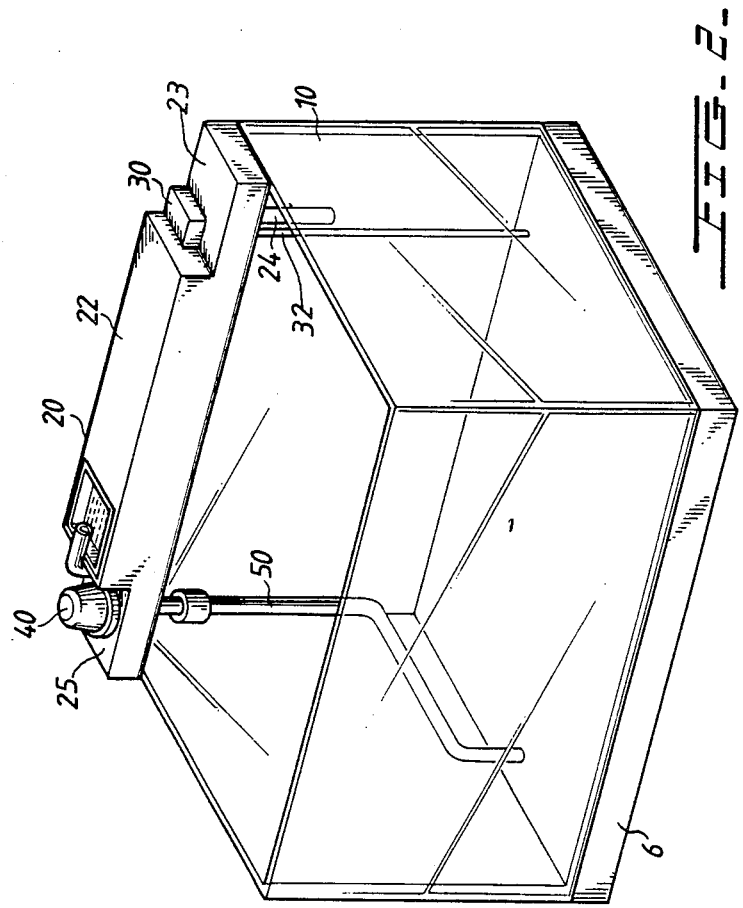
FIG. 2 is a perspective view of an aquarium cleaner in accordance with the present invention.

Referring to the drawings and initially to FIG. 2, it can be seen that an aquarium cleaner in accordance with the present invention contains a primary container 10, a secondary container 20, an air compressor 30, a water pump 40, a waste-pipe 50, and a base assembly 6.

The primary container 10, generally speaking, is a rectangular box which is open at the top end. The secondary container 20 primarily consists of a reservoir 22 which is provided on top of the container 10, with two platforms 23, 25 being respectively formed on each side of the reservoir 22. A filter (not shown) is provided on the bottom of the reservoir 22 for filtering out the dirt or other solid impurities, and a drainage pipe 24 is connected to the reservoir 22 under the lower surface of the filter for directing the filtered water into the primary container 10. The air compressor 30 is located on the first platform 23 for producing air bubbles, and the air bubbles are directed to the base assembly 6 by a flexible hose 32, which is connected directly to the air compressor 30. The water pump 40 is disposed on the top of the second platform 25, with one end of the waste-pipe 50 being connected to the water pump 40 and the other end of the waste-pipe 50 being connected to the base assembly 6. The dirty water in the base 6 can be drawn through the waste-pipe 50 to the reservoir 22 for being filtered.

Referring now to FIGS. 3 to 6, the base 6 is substantially a rectangular box, including a V-shaped gatherer 70, a cylinder 80 and a rotatable helical brush 90.

The rectangular box 60 has a top wavy sieving plate 61, a number of inclined surfaces 59, a number of substantially vertical surfaces 60 disposed alternatively to form the sieving plate 61, and a plurality of sieving slits 62 provided on the inclined surfaces of the wavy plate 61. A hole 63 is provided on the top plate for receiving one end of the waste-pipe 50. Normally, the waste-pipe 50 is made of resilient materials, such as rubber. The diameter of the waste-pipe 50 is slightly larger than that of the hole 63 so as to make an airtight engagement.

Figure 3:
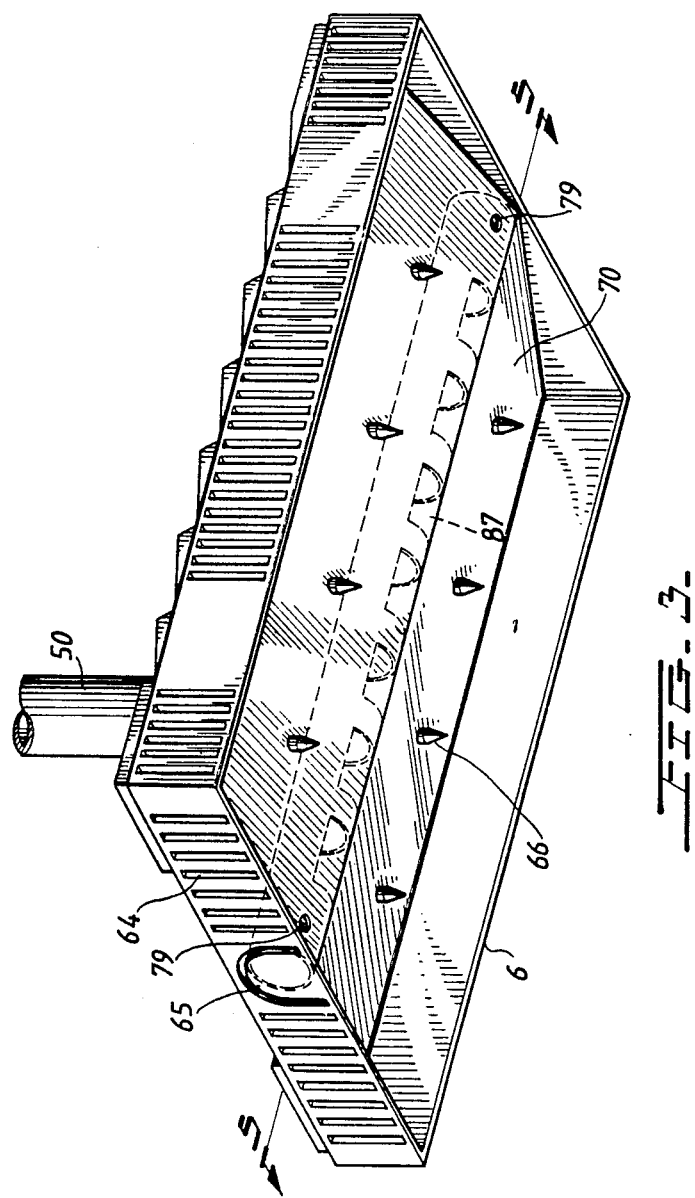
FIG. 3 is a perspective view of the bottom of the base portion of the aquarium cleaner of FIG. 2.
Figure 4:
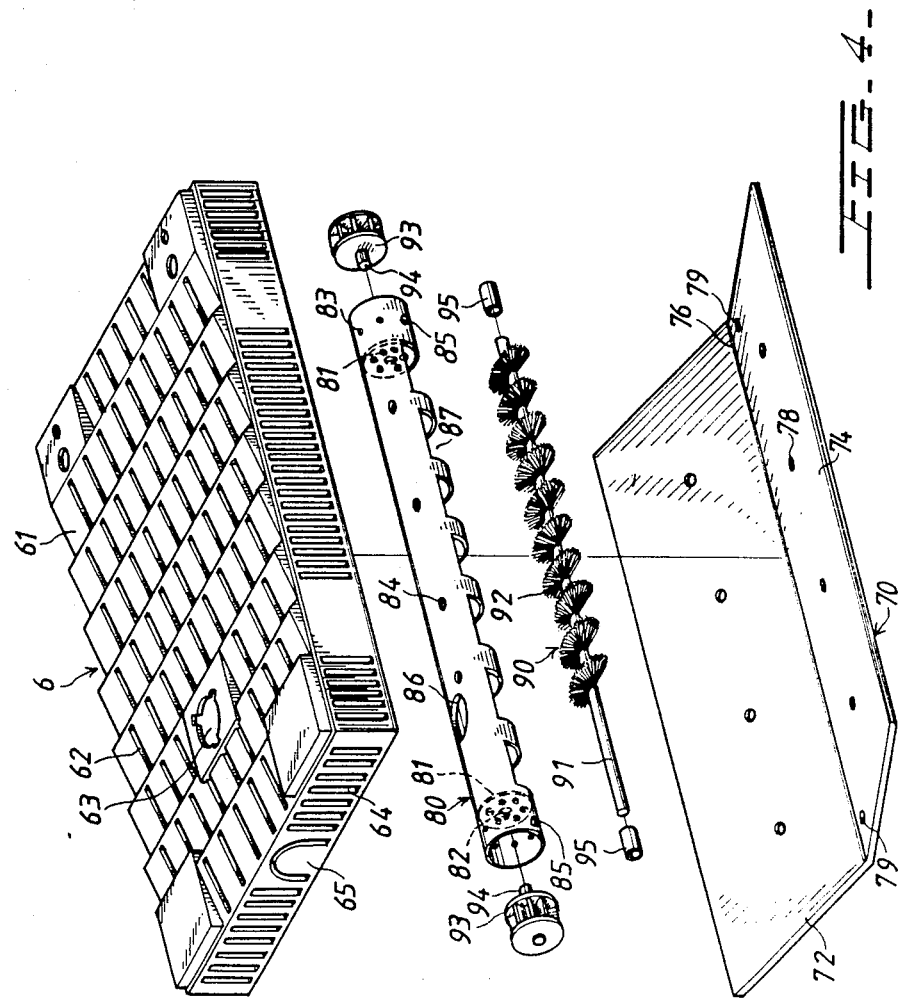
FIG. 4 is an exploded view of the base portion of FIG. 3, but viewed from above.

The four side-plates are provided with a series of vertical slots 64 and several dummy blocks 65 for better circulation between the bases if more than two bases are needed to fill the bottom of the aquarium. Several long studs 66 and short studs 67 extend in the box 60 from the lower surface of the top sieving plate 61, in which the long studs 66 extend to the bottom surface of the box 60, while the short studs 67 extend only about half of the height of the box 60, as best shown in FIG. 3.

The V-shaped gatherer 70 comprises two rectangular plates 72 and 74. A slot 76 is formed between the two plates 72 and 74. Two rows of stud holes 78 and two air holes 79 are formed on the plates 72 and 74. The gatherer 70 can be positioned within the box 60 by the studs 66 which pass through the stud holes 78. The air provided by the air compressor 30 flows through the hose 32 and bubbles up from under the holes 79. The dirt or the impurities coming from the sieving slits tend to deposit on the gatherer, thereby slipping down toward the slot 76 due to the inclination surface of the plates 72 and 74. Similarly, the hose 32 is made of resilient materials, such as rubber. The diameter of the hose 32 is slightly larger than that of the hole 79 in order to make an airtight frictional (force-fitted) engagement.

The cylinder 80 is separated into three regions by two disks 81 each having a center hole 82, in which the center region is larger than the two small regions on both sides of the cylinder. Several small holes 83 are provided on the disks 81 and the peripheral surface of the two small regions. On top of the cylinder 80, two rows of prearranged holes 84 are provided for receiving the short studs 67 so as to position the cylinder 80. An air hole 85 is formed on the lower surface of each end of the cylinder 80, and a hole 86 is formed on the top of the cylinder 80 corresponding to the hole 63 of the top sieving plate 61. The hole 86 receives the second end of the waste-pipe 50. A series of notches 87 are formed under the cylinder 80 within the central large region, so as to form a channel for passage of dirt.

The rotatable brush 90 is generally a shaft 91 with a helical brush 92 fixed thereon. A paddle wheel 93, having a rotating shaft 94 extending through the center hole 82 of the disk 81, is respectively frictionally engaged at each end of the shaft 91 by a connecting sleeve 95 respectively. Since the rotating speed of the rotating brush 90 and the relative torque are small, the connecting sleeve 95 can easily be frictionally engaged the shaft 94 of the paddle wheel 93 and the shaft 91 by the compressive force therebetween. Taped or conical surfaces can be further provided on the connecting ends of both shafts 94 and 91 for better connection. Alternatively, a dovetail joint could be employed to solidly connect the shafts 91 and 94. The compartments for the paddle wheels can be kept substantially clean by the disks 81.

Referring again to the drawings, while in operation, the air which is bubbled by the air pump is introduced to the lower end of the hole 79 of the gatherer 70 and bubbles up through the holes 79 and 85 (best shown in FIG. 7), thereby actuating the paddle wheel 93 and the rotating brush 92 connected therewith.

The impurities passing through the sieving slits 62 of the sieving plate 61 deposit on the gatherer 70 and tend to be collected in the slot 76 through notches 87 of the cylinder 80. The rotating helical brush 92 further pushes the impurities toward one end of the center region of the cylinder 80 and under the opening of the waste-pipe 50. The dirty water including those collected impurities is drawn through the waste-pipe 50 to the reservoir 22 by the water pump 40, thereby filtering out the impurities by the filter provided in the reservoir 22.

The claims appended hereto are meant to cover modifications and changes within the scope and spirit of the present invention. For example, the rotating brush 90 can be actuated by only one paddle wheel 93 instead of two, the other end being rotatably supported by the disk 81 or similar element. The shape of the gatherer may be varied according to that of the base. These and other modifications and changes are meant to be encompassed by the appended claims.

I claim:

1. A cleaner for cleaning solid impurities in an aquarium comprising:
    a filter;
    a water pump connecting to a first end of a waste-pipe;
    an air compressor having a hose connected to a first end of a hose; and
    a base assembly comprising:
    a substantially rectangular box having a top sieving plate with a plurality of sieving slits;
    a gatherer disposed in said box for collecting the impurities coming from the sieving slits;
    a cylinder having a first hole for receiving a second end of said waste-pipe, a second hole on a lower surface proximate to one end of said cylinder for receiving a second end of said hose, and a plurality of notches formed on the lower surface for passing the depositing impurities, said cylinder being clamped in said box between the sieving plate and the gatherer for confining a movement of the impurities collected therein;
    a rotatable cleaning means rotatably disposed in the cylinder for urging the impurities to one end of the cylinder closed to the compartment under the first hole of the cylinder; and
    an actuating means fixed to one end of the cleaning means for driving said cleaning means, said actuating means being driven by air provided from the hose.

2. A cleaner for cleaning solid impurities in an aquarium as set forth in claim 1, wherein said box of the base assembly has a plurality of slots on the peripheral sides thereof.

3. A cleaner for cleaning solid impurities in an aquarium as set forth in claim 1, wherein a disk is provided for separating the cylinder into two compartments, the actuating means being disposed in one of said compartments.

4. A cleaner for cleaning solid impurities in an aquarium as set forth in claim 3, wherein the actuating means is a paddle wheel.

5. A cleaner for cleaning solid impurities in an aquarium as set forth in claim 1, wherein the gatherer has two inclined surfaces to form a slot therebetween for collecting the impurities.

6. A cleaner for cleaning solid impurities in an aquarium as set forth in claim 1, wherein the rotatable cleaning means is a helical brush.

7. A cleaner for cleaning solid impurities in an aquarium as set forth in claim 1, wherein a second paddle wheel is fixed to the second end of the cleaning means.

8. A cleaner for cleaning solid impurities in an aquarium as set forth in claim 7, wherein a second disk is provided to make another compartment in the cylinder for accommodating the second paddle wheel.

* * * * *